Nov. 1, 1932.   P. C. TEMPLE   1,885,389
PRESSURE REDUCING AND REGULATING VALVE
Filed May 29, 1931   2 Sheets-Sheet 1

Inventor:
Paul C. Temple,
By Rector, Hibben, Davis and Macauley
Attorneys.

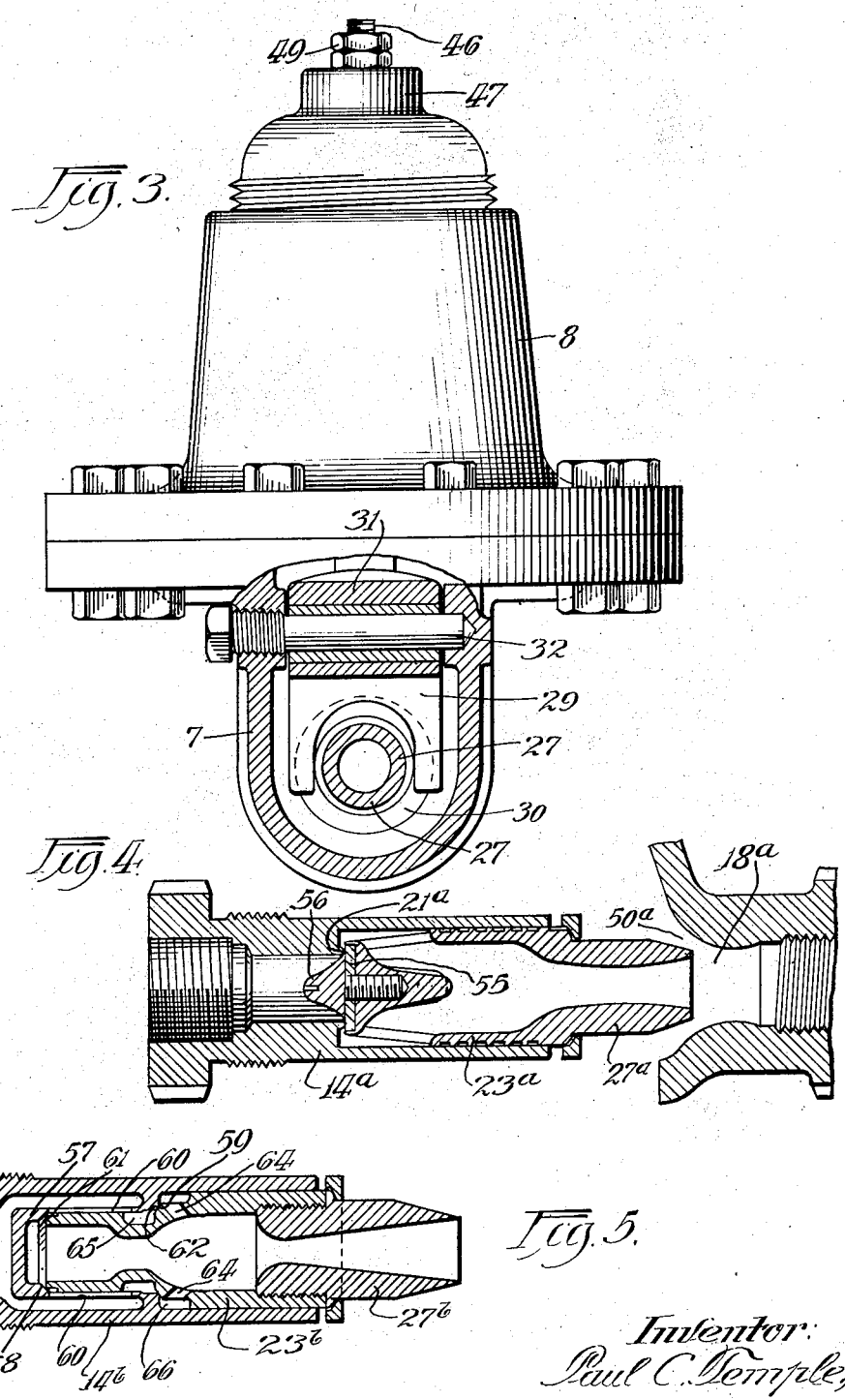

Patented Nov. 1, 1932

1,885,389

UNITED STATES PATENT OFFICE

PAUL C. TEMPLE, OF DECATUR, ILLINOIS, ASSIGNOR TO A. W. CASH COMPANY, OF DECATUR, ILLINOIS, A CORPORATION OF DELAWARE

PRESSURE REDUCING AND REGULATING VALVE

Application filed May 29, 1931. Serial No. 540,869.

REISSUED

My invention relates to pressure reducing valves and the objects of my invention, among others, are to maintain the reduced pressure practically uniform and with minimum fluctuations under varying demands and operating conditions, to adapt the valve for wider use in divers environments by satisfying requirements for large volume flow and for wide range of pressure reduction, to readily accommodate the valve for delivery of the fluid at reduced pressure either above or below atmospheric pressure, to provide a cheap, simple and durable structure for satisfactory performance of the above functions, and to provide for easy accessibility of the parts.

To these ends and others which will become apparent hereinafter, my invention consists in the features of construction and combinations and arrangements of parts hereinafter set forth and claimed.

In the drawings, Fig. 1 is a central vertical section through a valve embodying my invention;

Fig. 3 is an end view with parts shown in section as on the line 3—3 of Fig. 1; and Figs. 4 and 5 illustrate modified forms of removable valve units, the parts being shown in longitudinal section in both views.

Figure 1:
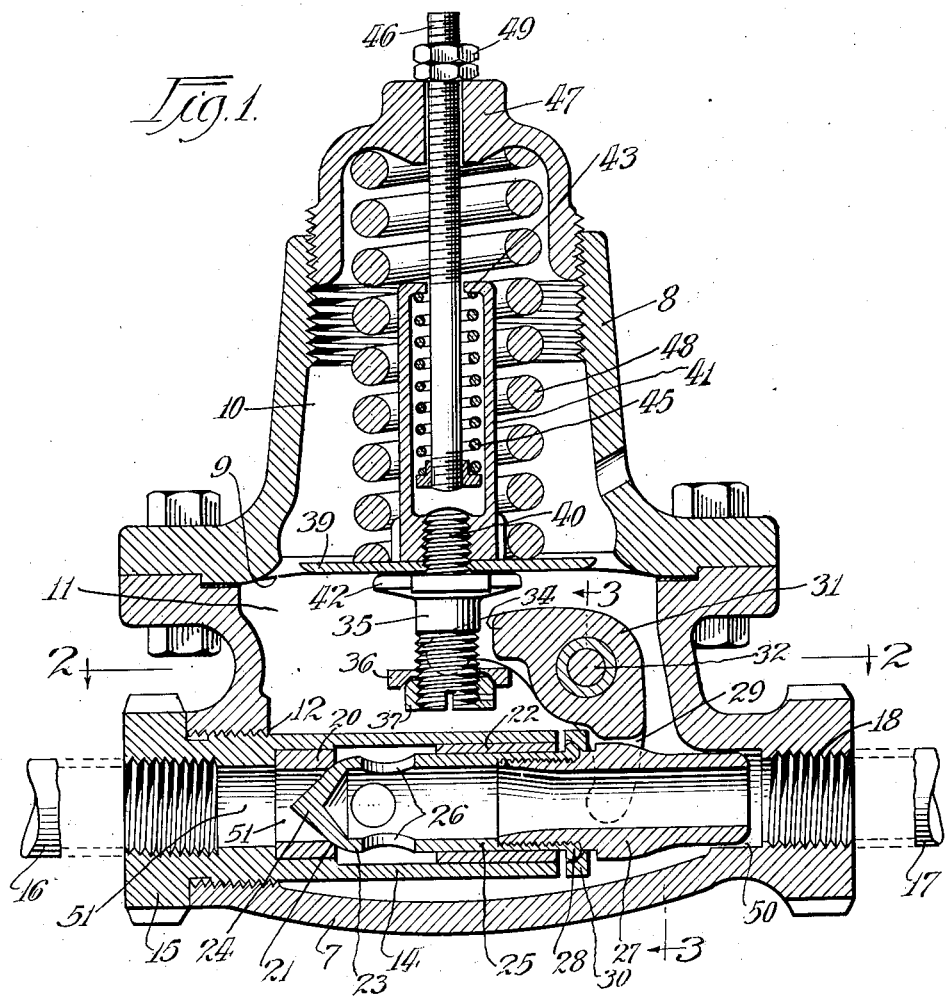

Referring first to Fig. 1, the valve shell or body comprises two parts or castings 7 and 8 having mating flanges held together by bolts in the usual way. A diaphragm 9, having its edge clamped between the two castings, divides the valve body into a spring chamber 10 and a control pressure chamber 11.

Figure 2:
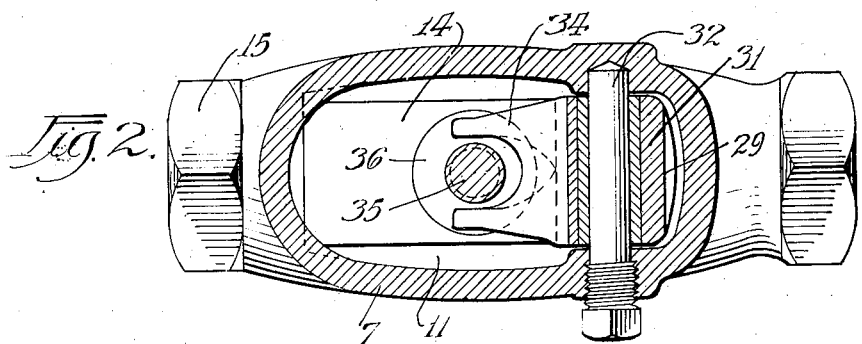
Fig. 2 is a cross section taken on the line 2—2 of Fig. 1.

One end of the body part 7 has a threaded opening 12 into which is screwed a tubular valve housing 14 having its enlarged exterior end 15 in the form of a nut to permit the valve housing and parts carried thereby to be mounted in place and readily removable when desired. The outer end of the bore in the valve housing is threaded to receive a supply pipe 16 in which the fluid is maintained at the initial high pressure. At the opposite end of the shell part 7 and in axial alignment with the housing 14 there is an opening 18 having a threaded portion for receiving the end of a delivery pipe 17. Secured against a shoulder in the bore of the valve housing 14 is a hardened ring 20 having a valve seat 21. A hardened tube 22 is fixedly mounted in the inner end of the valve housing and serves as a bearing for a valve member 23 having a conical valve head 24 and a sleeve or tubular portion 25 which is provided with large holes 26 adjacent the valve head. A tube 27 has its reduced threaded end screwed into the threaded end of the tubular portion 25 of the valve member. The bore of the tube 27 is conical being of least diameter at the end of the tube which extends into the plain circular bore of the delivery opening 18. A circular rib 28 on the sleeve 25 coacts with the ring 30 which has a conical inner surface to permit the ring to adjust itself on the rib 28. As shown in Figs. 1, 2 and 3, a bell crank lever 31 is mounted on a stud 32 carried by the casing member 7 and the arm 29 of the lever is forked to straddle the tube 27 and press against the ring 30 at points on opposite sides of the axis of the tube.

The other forked arm 34 (Figs. 1 and 2) of the lever 31 straddles a stud 35 which depends from the diaphragm and carries a ring 36 coacting with a nut 37 in the same way as the ring 30 coacts with the rib 28.

The customary bearing plate 39 is mounted on the upper side of the diaphragm 9 and a threaded pin 40, projecting upwardly from the stud 35, extends through a hole in the plate 39 and is screwed into a threaded opening in the lower end of an auxiliary spring housing 41. The stud 35 has an enlarged polygonal flange 42 to permit the application of a wrench, the diaphragm and plate 39 being firmly clamped between the flange 42 and lower end of the spring housing 41. The upper end of the spring housing has an inturned flange 43 against which the upper end of a light helical spring 45 is adapted to bear. The lower end of the spring 45 rests on a nut threaded on the lower end of the bolt 46, the upper end of which projects loosely through an opening in an adjustable cap 47 forming the upper end of the spring casing 8 into which it is screwed. Nuts 49, threaded on the upper projecting end of the bolt 46, permit nicety of adjustment of the spring 45. A heavy helical spring 48 is interposed between the cap 47 and the bearing plate 39.

In describing the operation of the device, let it first be assumed that the spring 48 is under compression to load the diaphragm and that the spring 45 is free and without effect, this condition being established by screwing the cap 47 downwardly. The normal reduced pressure in the delivery line is then greater than atmospheric pressure. By normal reduced pressure, I mean the selected pressure in the delivery line during zero demand, that is to say, with the delivery pipe 17 closed. When a normal demand is created by cutting in the equipment to be controlled or operated by the fluid flowing through the valve, the pressure in the delivery opening 18 drops slightly and as the control pressure space 11 is in communication with the delivery opening 18 through the annular passage 50, between the end of the tube 27 and the plain bore of the opening 18, the pressure in the control chamber drops correspondingly. Thus the pressure load on the underside of the diaphragm is decreased and the spring 48 moves the diaphragm and stud 35 downwardly and as movement of the lever 31 is now permitted, the initial high pressure of the fluid in the supply opening 51, acting on the head 24 of the valve, moves the valve permitting fluid flow through the valve and tube 27 into the delivery pipe. As the end of the tube 25 is relatively restricted the velocity of the fluid is increased at this point and, as the fluid passes out of the tube 27 into the pipe 17, it creates a suction or aspirating effect through the passage 50, further reducing the pressure in the control pressure space 11 with the result that the valve is still further opened so that an increased flow of fluid to the delivery pipe is permitted until the pressure in the delivery pipe builds up to the normal reduced pressure and then the valve seats and maintains a definite position so long as the demand remains uniform. Should the demand continue to increase, the increased velocity of the fluid passing the aspirating passage would further weaken the pressure in the control pressure space and the valve would be opened further to a corresponding extent. As the demand falls off, the pressure in the delivery pipe and control pressure space builds up and the valve finally closes when the demand becomes zero. The positioning of the end of the tube within the plain bore of the delivery opening, as shown in Fig. 1, prevents pulsation under all conditions.

If the valve is to be used in an environment in which the normal reduced pressure is below atmospheric pressure, it is necessary to provide means tending to raise the diaphragm as otherwise the atmospheric pressure on the upper side of the diaphragm would be greater than the pressure exerted on the underside when the pressure in the control pressure space built up to normal and the valve would not close. To this end, I provide the spring 45. When the normal reduced pressure is to be below atmospheric pressure, the cap 47 is turned to raise it by the screw threaded action so that the load on the spring 48 is relieved and the spring 45 is placed under compression. This single adjustment may be sufficient to accomplish this double purpose. The nuts 49 on the bolt 46 may be turned to further adjust the spring 45 if desired. It will be apparent that with the valve in this condition, it operates as described above, except that the spring 48 is inactive and atmospheric pressure alone loads the diaphragm and the spring 45 acts against this pressure. It will be noted that I have eliminated the use of any spring in the control pressure space or where it would be subjected to any deteriorating effect of the fluid handled by the valve. Under some unusual conditions, such as when the initial pressure is extremely high, say 900 pounds, and the normal reduced pressure is slightly above atmospheric pressure, for example 20 pounds, the spring 48 is disabled and the spring 45 enabled because of the great pressure exerted on the end of the valve together with the atmospheric pressure exerted on top of the diaphragm exercise a greater force than the force exerted on the underside of the diaphragm by the 20 pounds pressure in the control pressure space.

One of the advantages of my valve is that it has large capacity, that is to say it is adapted to efficiently handle large fluid flow to satisfy unusually large volumetric demands, though it be of ordinary size. The above described aspirating action contributes to the performance of this function, but I still further increase the capacity by constructing the valve and arranging the inlet opening, valve and delivery opening so that the fluid flow through the valve is substantially straight. More particularly, the inlet opening 51, the valve housing 14, the valve member 23 and tube 27 and the delivery opening 18 are all arranged in axial alignment and the head 24 of the valve is shaped and the large holes 26 placed so that the fluid flows in a straight line through the structure except as it passes the valve head and there the path is slightly curved and not a sharp or right angle bend.

It will be noted that I have provided for ready accessibility and removability of the various parts of the valve without disturbing the parts not removed. The valve housing 14, together with the valve and tube as a unit, may be removed and replaced without effecting the lever 31 or any of the adjustments.

In Fig. 4, I have shown another form of the valve unit. It will be evident that in this instance the tube 27ᵃ is formed integral with the sleeve of the valve member 23ᵃ. The tube 27ᵃ is Venturi shape having its most restricted portion at the center of the tube, rather than at the end as in the form shown in Fig. 1. The valve seat 21ᵃ is in the form of a circular rib on the housing 14ᵃ and this seat is adapted to be engaged by a valve disk 55 secured to the valve member by a conically headed screw 56. It will be observed that the end of the tube 27ᵃ projects into the flared end of the modified delivery opening 18ᵃ so that the aspirating passage 50ᵃ varies in size and effect as the valve is moved different extents.

In Fig. 5, I have shown still another form of valve unit. In this instance, the housing 14ᵇ has an interior tubular projection 57 provided with two valve seats 58 and 59 and enlarged openings 60 (preferably four) between the valve seats. The valve member 23ᵇ is in the form of a sleeve having two seats 61 and 62 adapted to engage the seats 58 and 59, respectively. Beyond the seat 62, the valve sleeve is provided with a plurality of inclined openings 64. Screwed into the inner end of the valve sleeve is a Venturi tube 27ᵇ. The operation of the valve is the same as that described above in connection with the form shown in Fig. 1 except when the valve is open fluid from the high pressure side passes through the openings 60 and into the open end of the valve sleeve and also through a groove 65 in the sleeve, an annular space 66, and the openings 64 into the valve.

While I have herein described in detail specific features that I claim for their particular advantage, it will be apparent that many changes of detail may be made without departure from the spirit of my invention within the scope of the appended claims.

I claim:

1. In a pressure-reducing and regulating valve, a structure providing a high pressure space, a control pressure space and a delivery opening, a pressure responsive member subjected to the influence of the pressure in said control pressure space, a spring acting on said member, a valve associated with said member, and a tube affording an aspirating passage between said control pressure chamber and said delivery opening and automatically movable axially of said delivery opening responsive to said pressure responsive member.

2. In a pressure reducing and regulating valve, a structure providing a control pressure space and a high pressure opening and a delivery passage in axial alignment, a pressure responsive member under the influence of the pressure in said control pressure space, a valve associated with said pressure responsive member for controlling the flow from said high pressure opening, and a tube affording an aspirating passage between said control pressure chamber and said delivery passage, the tube being in axial alignment with said delivery passage and high pressure opening and movable with the valve.

3. In a pressure reducing and regulating valve, a structure providing a high pressure opening, a delivery opening in axial alignment therewith, and a control pressure space, a valve having a sleeve, a tube having a restricted portion in axial alignment with said sleeve and delivery opening and providing an aspirating opening between the control pressure space and the delivery opening, and a pressure responsive member influenced by the pressure in said control pressure space and associated with said valve and tube.

4. In a pressure reducing and regulating valve, a structure providing a high pressure opening, a delivery opening in axial alignment therewith, and a control pressure space, a valve having a sleeve, the valve being opened with and by the high pressure at said high pressure opening, a tube having a restricted portion in alignment with said sleeve and delivery opening and providing an aspirating opening between the control pressure space and the delivery opening, a pressure responsive member influenced by the pressure in said control pressure space and associated with said valve, and a spring acting on said pressure responsive member and tending to move the latter to permit the valve to open.

5. In a pressure reducing and regulating valve, a structure providing a high pressure opening, a control pressure space, and a delivery passage, a valve coacting with said opening and having a sleeve portion, a tube causing an aspirating effect between the flow and the control pressure space, said opening, delivery passage, sleeve portion and tube being in axial alignment, and a pressure responsive member associated with said valve.

6. In a pressure reducing and regulating valve, a casing providing a control pressure space and having a delivery opening, a valve housing mounted in said casing and having a tubular extension projecting into said control pressure space, a valve mounted in said tubular extension, and an aspirating tube, said tubular extension, delivery opening and aspirating tube being in axial alignment, and a pressure responsive member associated with said valve.

7. In a pressure reducing and regulating valve, a casing providing a control pressure space and having a delivery opening, a valve housing demountably positioned in the wall of said casing and having a valve seat, a valve coacting with said seat, a tube for causing an aspirating effect between said control pressure space and the fluid flow, a pressure responsive member, and connections controlled by said pressure responsive member for controlling the valve, said valve and tube being removable as a unit with said valve housing without disturbing said connections.

8. In a pressure reducing and regulating valve, a casing providing a control pressure space and having a delivery opening, a valve housing demountably mounted in said casing and having a tubular extension projecting into said control pressure space, a valve mounted in said tubular extension, and an aspirating tube, said tubular extension, delivery opening and aspirating tube being in axial alignment and said valve and aspirating tube being removable from the casing as a unit with the valve housing, and a pressure responsive member associated with said valve.

9. In a pressure reducing and regulating valve, a structure providing a control pressure space and a spring chamber, a diaphragm between said space and chamber, a spring in said chamber acting on said diaphragm, a removable valve housing projecting into said control pressure space, a valve mounted in said housing, a stud projecting from said diaphragm, an abutment on said stud, an abutment on said valve, and a lever having two forked arms one contacting with said first mentioned abutment at points on opposite sides of the axis of said stud and the other contacting with said second mentioned abutment at points on opposite sides of the axis of said valve, the valve housing and valve being removable without disturbing said lever.

10. In a pressure reducing and regulating valve, a structure providing a control pressure space, a high pressure space, a valve opening, a delivery opening in axial alignment with the valve opening, and a tubular valve housing, a pressure responsive member, and a valve member in said housing and having a head and a sleeve, the sleeve being in axial alignment with said openings and being provided with apertures, and the head, housing and aperture being formed and arranged so that the fluid flow is straight except for a relatively small bending as the fluid passes the valve head.

11. In a pressure reducing and regulating valve, a structure providing a control pressure space, a high pressure space, a valve opening, a delivery opening in alignment with the valve opening, a tubular valve housing, a pressure responsive member, and a valve member housed by said housing and having a sleeve with the sleeve in axial alignment with said openings, the housing and valve being so formed and arranged that the fluid flow from the valve opening to the delivery opening is substantially straight and is through the housing and sleeve.

In testimony whereof, I have subscribed my name.

PAUL C. TEMPLE.